United States Patent [19]

Takagi et al.

[11] Patent Number: 5,149,005
[45] Date of Patent: Sep. 22, 1992

[54] MAGNETIC TAPE WIND-UP METHOD

[75] Inventors: Akira Takagi; Masao Tsuruta; Akihisa Kita; Shingo Sawahara, all of Kanagawa, Japan

[73] Assignee: Fuji Photo Film Co., Ltd., Kanagawa, Japan

[21] Appl. No.: 785,866

[22] Filed: Oct. 29, 1991

Related U.S. Application Data

[63] Continuation of Ser. No. 568,669, Aug. 15, 1990, abandoned, which is a continuation of Ser. No. 360,684, Jun. 2, 1989, abandoned.

[30] Foreign Application Priority Data

Jun. 3, 1988 [JP] Japan ............................. 65-136892

[51] Int. Cl.$^5$ .................... B65H 18/10; B65H 27/00
[52] U.S. Cl. .................... 242/67.1 R; 242/76
[58] Field of Search .............. 242/197, 76, 147 A, 242/199, 67.1 R, 56 R; 360/130.3, 130.31, 130.33, 132; 226/97

[56] References Cited

U.S. PATENT DOCUMENTS

| | | | |
|---|---|---|---|
| 4,091,979 | 5/1978 | Browder | 242/76 X |
| 4,098,446 | 7/1978 | Schoettle et al. | 242/192 X |
| 4,128,852 | 12/1978 | Senkpiel et al. | 242/192 X |
| 4,305,536 | 12/1981 | Burdorf et al. | 242/76 X |
| 4,789,110 | 12/1988 | Sakaguchi et al. | 242/67.1 R |
| 4,838,496 | 6/1989 | Kubota et al. | 242/67.1 R |

Primary Examiner—Daniel P. Stodola
Assistant Examiner—William G. Battista, Jr.
Attorney, Agent, or Firm—Sughrue, Mion, Zinn, Macpeak & Seas

[57] ABSTRACT

A magnetic tape wind-up method comprises the steps of winding up a magnetic tape around a hub, which is incorporated in a cassette case, while the magnetic tape is being moved and is in contact with a contact member provided in the cassette case. The magnetic tape is wound up while a gas is being blown against the contact member or against a portion of the magnetic tape, which portion is present in the vicinity of the contact member, in such a way that the gas flows between the contact member and the magnetic tape.

15 Claims, 4 Drawing Sheets

MAGNETIC TAPE WIND-UP METHOD

This is a continuation of application Ser. No. 07/568,669 filed Aug. 15, 1990, which was a continuation application of application Ser. No. 07/360,684 filed Jun. 2, 1989, both now abandoned.

BACKGROUND OF THE INVENTION

1. Field of the Invention

This invention relates to a magnetic tape wind-up method for winding up a magnetic tape around a hub, which is incorporated in a cassette case, while the magnetic tape is being moved and is in contact with a contact member, such as a guide pole, provided in the cassette case.

2. Description of the Prior Art

Tape cassettes such as video tape cassettes comprise a cassette case, a pair of reel hubs which are provided in the cassette case, and a magnetic tape which is wound around the reel hubs.

Various methods have heretofore been used to assemble the tape cassettes. One of such methods, a V-O method, is disclosed in, for example, Japanese Unexamined Patent Publication Nos. 55(1980)-77057 and 62(1987)-106377. With the V-O method, instead of a magnetic tape first being wound around a pair of reel hubs and then the reel hubs being incorporated into a cassette case, a pair of reel hubs connected to each other by a leader tape are first incorporated into a cassette case. Thereafter, the leader tape is pulled out and cut, and an edge of a magnetic tape is joined to one of the cut edges of the leader tape. The reel hub having the leader tape portion joined to the magnetic tape is then rotated and winds up the magnetic tape.

However, in the cassette case a contact member, such as a guide pole, is provided, and it comes into contact with the magnetic tape when the magnetic tape is moved. Therefore, with the aforesaid method for winding up a magnetic tape around a reel hub incorporated in the cassette case, as the magnetic tape is wound up around the reel hub and is moved into the cassette case, a magnetic surface thereof is in contact with the guide pole. As a result, problems described below arise when the magnetic tape is quickly wound up in order to shorten the time required to produce the tape cassettes.

First, in cases where the magnetic tape is moved quickly while it is in contact with the guide pole, tension on the magnetic tape is lost or fluctuates because of resistance between the magnetic surface of the magnetic tape and the surface of the guide pole. Therefore, it is not always possible to wind up the magnetic tape reliably around the reel hub.

Also, in cases where the magnetic tape is wound up quickly around the reel hub, the magnetic surface of the magnetic tape rubs against the surface of the guide pole. As a result, a magnetic layer on the magnetic surface is separated from the magnetic surface, which causes drop-outs to arise during magnetic recording and reproduction.

Moreover, side edges of the magnetic tape have burrs depending on how the magnetic tape was cut from a magnetic tape web in the process used to make magnetic tapes. When the magnetic tape is moved quickly while it is in contact with the guide pole, burrs are separated from the side edges of the magnetic tape and appear as white powder, which accumulates on the guide pole. The white powder moves from the guide pole to the magnetic tape and clings thereto when the magnetic tape is moved during magnetic recording and reproduction. The white powder on the magnetic tape generates drop-outs.

SUMMARY OF THE INVENTION

The primary object of the present invention is to provide a magnetic tape wind-up method wherein a magnetic tape is reliably wound up around a hub even though the magnetic tape is moved quickly.

Another object of the present invention is to provide a magnetic tape wind-up method wherein drop-outs do not increase during magnetic recording and reproduction even though a magnetic tape is quickly wound up around a hub.

The present invention provides a magnetic tape wind-up method for winding up a magnetic tape around a hub, which is incorporated in a cassette case, while the magnetic tape is being moved and is in contact with a contact member provided in the cassette case, wherein the improvement comprises the steps of winding up said magnetic tape while a gas is being blown against said contact member or against a portion of said magnetic tape, which portion is present in the vicinity of said contact member, so that the gas flows between said contact member and said magnetic tape.

The gas may be blown from the contact member side against a portion of the magnetic tape, which portion is present in the vicinity of the contact member on the upstream side thereof as viewed in the direction along which the magnetic tape is moved. Alternatively, in cases where the width of the contact member, which width is taken in the direction of the width of the magnetic tape, is larger than the width of the magnetic tape, and the contact member extends over a predetermined length in the direction along which the magnetic tape is moved, a gas may be blown from the magnetic tape side against the contact member.

When the magnetic tape is wound up while a gas, such as air, is being blown against the contact member or against a portion of the magnetic tape, which portion is present in the vicinity of the contact member, in such a way that the gas flows between the contact member and the magnetic tape, a layer of the gas forms between the contact member and the magnetic tape which is being moved along the contact member. The layer of gas has the effect of separating the magnetic tape from the contact member and decreasing the resistance to the movement of the magnetic tape.

When the gas is blown from the contact member side against a portion of the magnetic tape, which portion is present in the vicinity of the contact member on the upstream side thereof as viewed in the direction along which the magnetic tape is moved, the gas flows more reliably between the magnetic tape and the contact member.

Also, in cases where the width of the contact member, which width is taken in the width direction of the magnetic tape, is larger than the width of the magnetic tape and the contact member extends over a predetermined length in the direction along which the magnetic tape is moved, the gas can be made to flow reliably between the magnetic tape and the contact member when the gas is blown from the magnetic tape side against the contact member.

With the magnetic tape wind-up method in accordance with the present invention, the magnetic tape is wound up while a gas is being blown against the contact member or against a portion of the magnetic tape, which portion is present in the vicinity of the contact member, in such a way that the gas flows between the contact member and the magnetic tape. Therefore, the magnetic tape is separated from the contact member as it passes over the contact member, and the resistance to the movement of the magnetic tape is reduced markedly.

Therefore, the magnetic tape can be reliably wound up around a hub even though the magnetic tape is moved quickly. Also, even though a magnetic tape is quickly wound up around a hub, it is possible to eliminate the problem of the number of drop-outs occurring during magnetic recording and reproduction increasing due to contact between the contact member and the magnetic surface or the side edges of the magnetic tape. Accordingly, the magnetic tape can be wound up quickly and reliably.

DESCRIPTION OF THE PREFERRED EMBODIMENTS

The present invention will hereinbelow be described in further detail with reference to the accompanying drawings.

Figure 1:
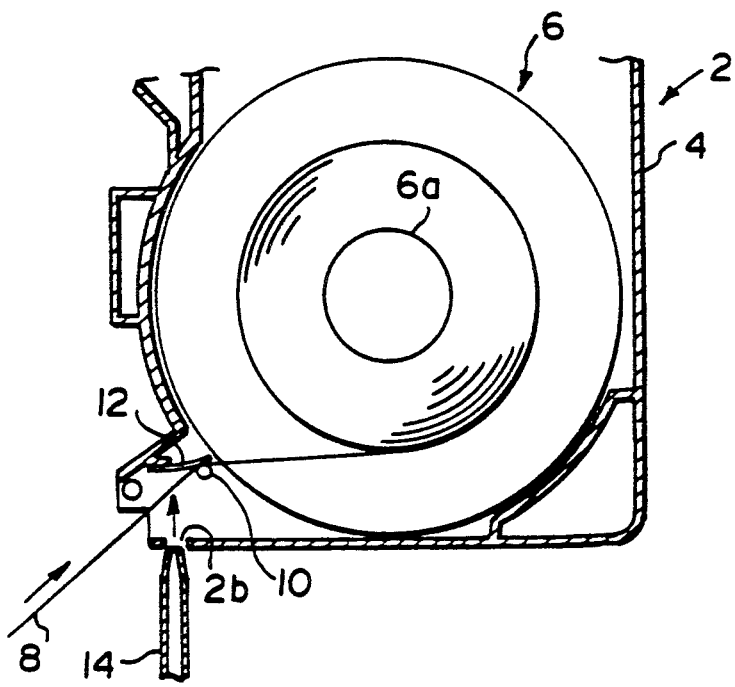
FIG. 1 is a sectional view taken along line I—I of FIG. 2.
Figure 2:
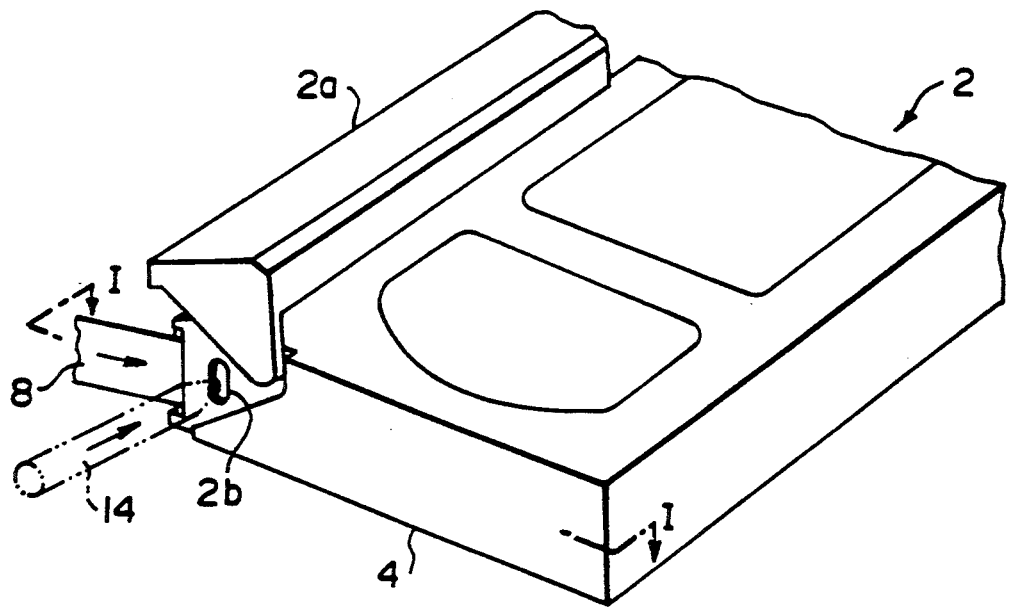
FIG. 2 is a perspective view showing an embodiment of the magnetic tape wind-up method in accordance with the present invention.

FIG. 1 is a sectional view taken along line I—I of FIG. 2, and FIG. 2 is a perspective view showing an embodiment of the magnetic tape wind-up method in accordance with the present invention, which is applied to a ½ inch, VHS format, video tape cassette.

With reference to FIGS. 1 and 2, a video tape cassette 2 comprises a cassette case 4, and a pair of reels 6, 6 (only one thereof is shown) incorporated in the cassette case 4. A magnetic tape 8 is introduced into the cassette case 4 and moved between a guide pole 10 and a tape pad 12, which act as contact members. The direction of movement of the magnetic tape 8 is changed by the guide pole 10, and the magnetic tape 8 is wound up around a reel hub 6a.

As shown in FIG. 2, when the magnetic tape 8 is wound up around the reel hub 6a, a guard panel 2a in the cassette case 4 is rotated, which opens the front face of the cassette case 4. Therefore, an opening 2b, through which a tape end can be detected appears at a side face of the cassette case 4.

During the winding up of the magnetic tape 8 around the reel hub 6a, an air outlet of an air nozzle 14 is located at the opening 2b in order to blow air into the cassette case 4.

In this embodiment, the air nozzle 14 is located in a direction normal to the side face of the cassette case 4. The air nozzle 14 blows air in the direction indicated by the arrow in FIG. 1 against the magnetic tape 8 and the tape pad 12.

As for the guide pole 10, which is one of the contact members, air blown from the air nozzle 14 has the effects described below. Air is blown from the side of the guide pole 10 against a portion of the magnetic tape 8, which portion is present in the vicinity of the guide pole 10 on the upstream side thereof as viewed in the direction along which the magnetic tape 8 is moved (i.e. on the left side of the guide pole 10 in FIG. 1). Part of the air which has impinged upon the magnetic tape 8 is guided by the surface of the magnetic tape 8 and made to flow between the magnetic tape 8 and the guide pole 10 as the magnetic tape 8 is moved. As a result, a layer of air is formed between the magnetic tape 8 and the guide pole 10. Therefore, as the magnetic tape 8 is moved along the guide pole 10, it is slightly spaced apart from the guide pole 10, and the resistance to the movement of the magnetic tape 8 is markedly reduced. Accordingly, even though the magnetic tape 8 is moved quickly, problems caused by contact between the magnetic tape 8 and the guide pole 10 can be minimized.

Figure 3:
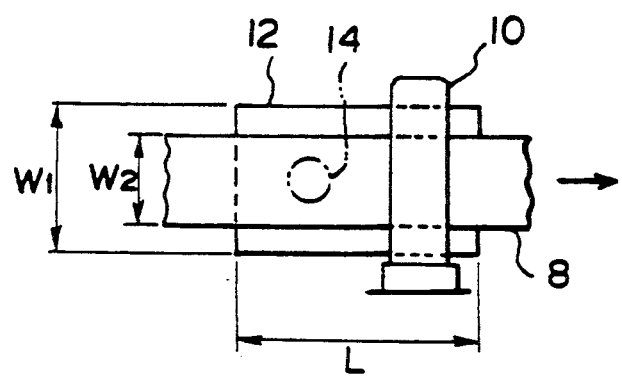
FIG. 3 is a schematic view showing the part near the tape pad in the configuration of FIG. 1, which part is viewed from the direction along which air is blown against the tape pad.

As for the tape pad 12 which is one of the contact members, air blown from the air nozzle 14 has the effects described below. As shown in FIG. 3, the width W1 of the tape pad 12 as taken in the width direction of the magnetic tape 8 is larger than the width W2 of the magnetic tape 8, and the tape pad 12 extends over a predetermined length L along which the magnetic tape 8 is moved. Therefore, air blown from the side of the magnetic tape 8 impinges upon both side edge portions of the tape pad 12 which extend beyond the magnetic tape 8. Thereafter, air flows between the tape pad 12 and the magnetic tape 8, and a layer of air is formed therebetween. Accordingly, as the magnetic tape 8 is moved along the tape pad 12, it is slightly spaced apart from the tape pad 12, and problems caused by contact between the magnetic tape 8 and the tape pad 12 can be minimized.

The tape pad 12 is constituted of a plastic sheet and can readily be flexibly deformed. Therefore, when air is blown from the side of the magnetic tape 8 against the tape pad 12, the tape pad 12 is bent away from the magnetic tape 8. It is considered that the bending of the tape pad 12 also contributes to the reduction in the resistance to the movement of the magnetic tape 8.

Figure 4:
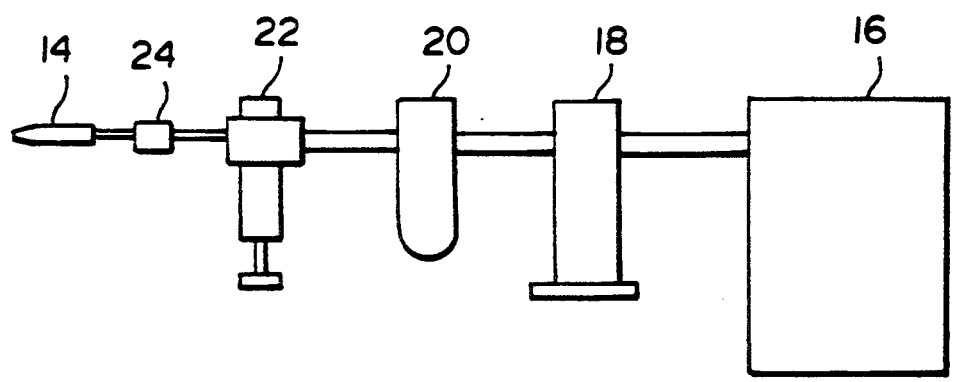
FIG. 4 is a schematic view showing an air blowing device.

A device as shown in FIG. 4 is used to blow air. Specifically, air is compressed by a compressor 16, and compressed air is blown out of the air nozzle 14 via a dryer 18, a filter 20, a regulator 22 and a throttle valve 24.

The air must be clean since it is directly blown against the magnetic tape 8. Therefore, the dryer 18 and the high-performance filter 20 constituted of a HEPA filter or the like are provided in order to remove moisture, oil, dust or the like from the air. The regulator 22 and the throttle valve 24 adjust the flow rate of the air and the pressure at which the air is blown.

In the aforesaid embodiment, good results were obtained when an air nozzle 14 having an inner diameter of 2.4 mm was used, and the pressure at which the air was blown and the flow rate of the air were adjusted respectively to 1.0 kg/cm$^2$ and 40 Nl/min. by the regulator 22 and the throttle valve 24. The speed at which the magnetic tape 8 was moved was 8 m/sec., and the tension on the magnetic tape 8 was 100 g.

The desired flow rate of the air varies depending on various conditions. For example, in the aforesaid embodiment, the flow rate of the air should preferably fall within the range of 10 Nl/min. to 50 Nl/min. When the flow rate of the air was lower than 10 Nl/min., a layer of air could not substantially be formed between the magnetic tape 8 and the guide pole 10, and good results could not be obtained. When the flow rate of the air was higher than 50 Nl/min., the air stream was excessively strong, and the magnetic tape 8 could not be reliably moved and wound up.

Figure 5:
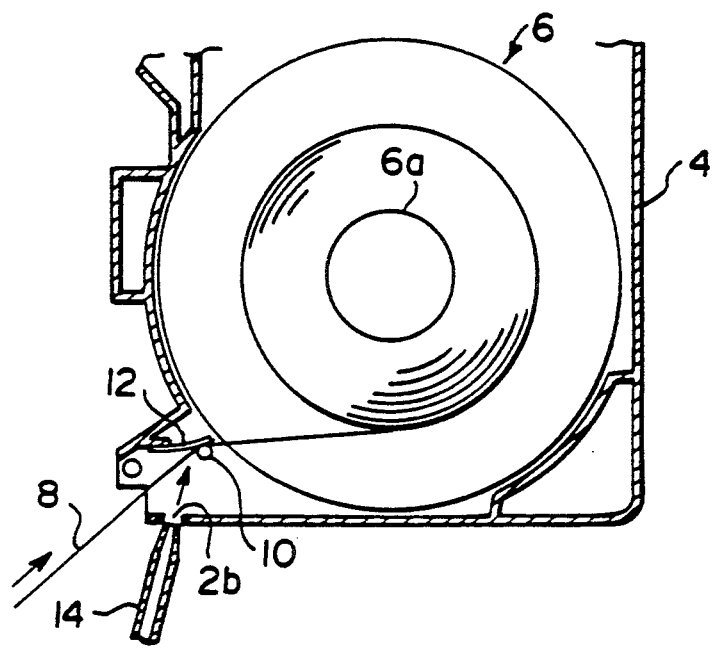
FIGS. 5, 6 and 7 are sectional views showing different embodiments of the magnetic tape wind-up method in accordance with the present invention.
Figure 6:
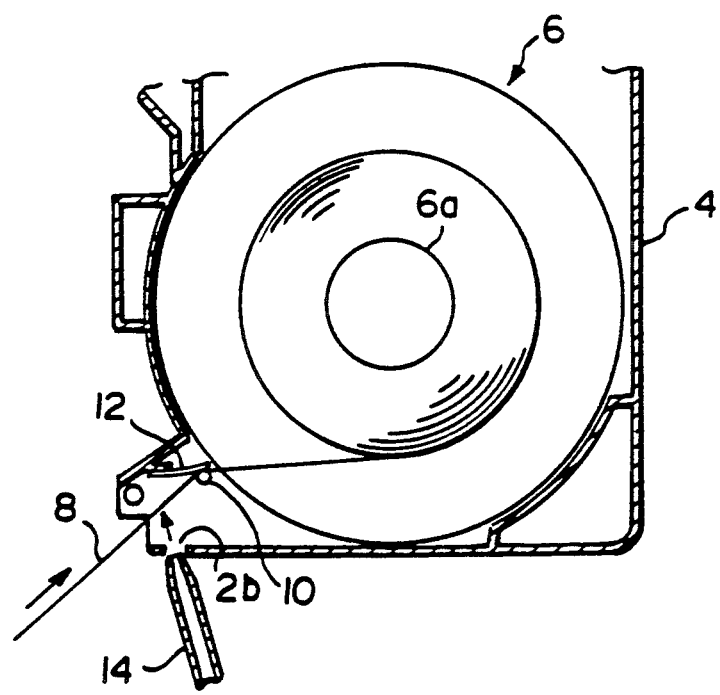

In the aforesaid embodiment, air is blown in a direction normal to the side face of the cassette case 4. However, as shown in FIG. 5, air may be blown directly against the position at which the magnetic tape 8 meets the guide pole 10. The direction in which the air is blown as shown in FIG. 5 is preferable from the viewpoint of the formation of the air layer between the magnetic tape 8 and the guide pole 10. Alternatively, as shown in FIG. 6, air may be blown against a portion of the magnetic tape 8, which portion is present at a predetermined small distance from the guide pole 10. In such cases, the amount of air which is blown should preferably be increased as compared with cases shown in FIG. 5.

Figure 7:
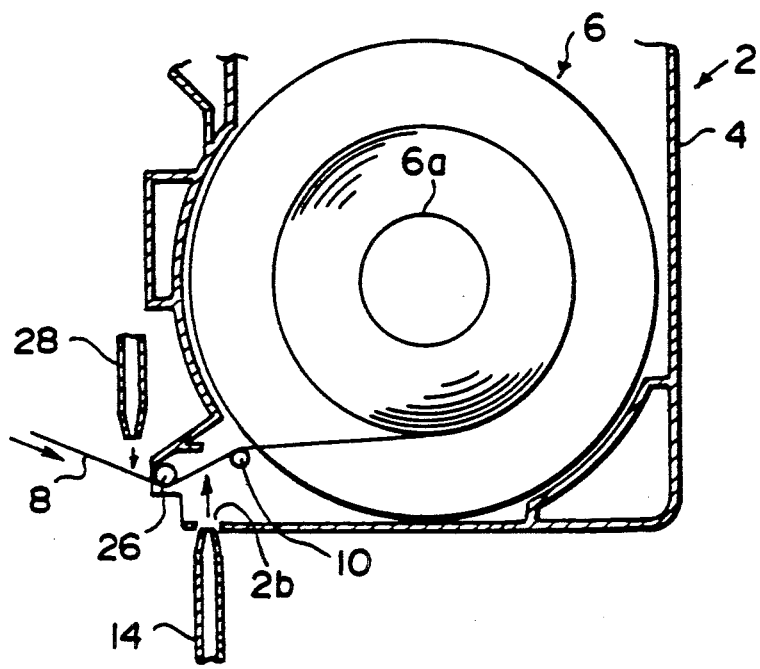

FIG. 7 shows an embodiment wherein no tape pad is provided and the magnetic tape 8 is wound up around the reel hub 6a while it is moved along the guide pole 10 and a guide pole 26. Air is blown out of the air nozzle 14 against the magnetic tape 8 so that the magnetic tape 8 separates from the guide pole 10 as in the embodiment shown in FIG. 1. Also, air is blown out of an air nozzle 28 against a portion of the magnetic tape 8, which portion is present in the vicinity of the guide pole 26 on the upstream side thereof as viewed in the direction along which the magnetic tape 8 is moved, so that the magnetic tape 8 separates from the guide pole 26 as it moves into the cassette case 4. With this embodiment, problems caused by contact between the magnetic tape 8 and the guide poles 10 and 26 did not arise, and the magnetic tape 8 could be wound up reliably. Therefore, the tape pad 12 need not necessarily be provided on the back surface side of the magnetic tape 8, and air need not necessarily be blown to a position inside of the cassette case 4.

Figure 8:
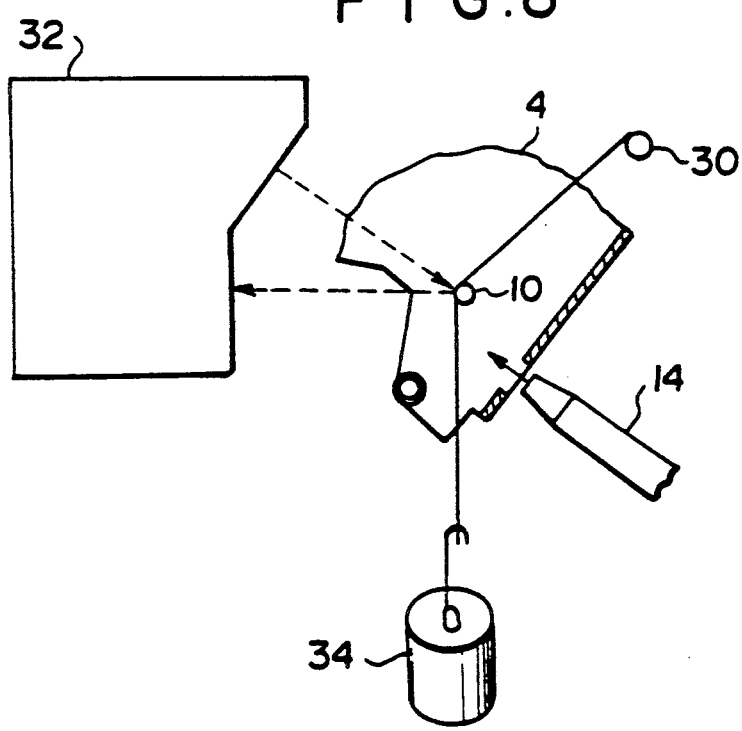
FIG. 8 is a schematic view showing a device for investigating the separation of the magnetic tape from the contact member.

In order to confirm that a layer of air formed between the magnetic tape 8 and the guide pole 10 when air was blown in the manner described above, experiments were carried out with a device as shown in FIG. 8.

In the experiments, part of the cassette case 4 was cut away, and the magnetic tape 8 having one edge secured to a support member 30 was threaded over the guide pole 10. Air was blown out of the air nozzle 14, and the distance by which the magnetic tape 8 was separated from the guide pole 10 was measured by use of a light reflection type position sensor 32. The tension on the magnetic tape 8 was adjusted by means of a weight 34, and the flow rate of the air was adjusted to 40 Nl/min.

The experiments revealed that, when the value of the weight 34 was within the range of 90 g to 110 g, the distance by which the magnetic tape 8 was separated from the guide pole 10 by the formation of an air layer therebetween was within the range of 0.15 to 0.2 mm. Actually, the magnetic tape 8 is moved along the guide pole 10. However, the fluctuation in the tension on the magnetic tape 8 as it is being moved is several grams at the most. Therefore, it is considered that the magnetic tape 8 is actually separated from the guide pole 10 by the formation of an air layer therebetween when the magnetic tape 8 is being moved along the guide pole 10.

With conventional techniques wherein a magnetic tape is wound up without air being blown, the guide pole is polished as the magnetic tape slides along the guide pole, and an increase in the luster of the guide pole is confirmed clearly. The increase in the luster of the guide pole indicates that the magnetic tape rubs strongly against the guide pole and is subjected to large damage and high resistance when the magnetic tape is moved along the guide pole.

On the other hand, with the magnetic tape wind-up method in accordance with the present invention wherein a magnetic tape is wound up with air being blown, no increase in the luster of the guide pole arises. Specifically, when air is blown in the manner described above, an air layer forms between the magnetic tape and the guide pole and separates the magnetic tape from the guide pole during the movement of the magnetic tape along the guide pole, and the resistance to the movement of the magnetic tape can be reduced markedly.

Therefore, loss and fluctuation in the tension on the magnetic tape which is being moved along the guide pole are minimized, and the magnetic tape can be wound up reliably. Also, damage to the magnetic surface of the magnetic tape, which damage is caused by contact between the magnetic surface and the guide pole, can be decreased, and an increase in the drop-outs occurring during magnetic recording and reproduction can be prevented. Moreover, it is possible to minimize the generation of white powder, which occurs when the side edges of the magnetic tape are moved while they are in contact with the guide pole, and to prevent the number of drop-outs from increasing during magnetic recording and reproduction.

The aforesaid embodiments are applied when a magnetic tape is wound up in a video tape cassette. However, the magnetic tape wind-up method in accordance with the present invention is applicable also when magnetic tapes are wound up in other types of tape cassettes. Also, gases other than air, for example nitrogen gas, may be employed.

We claim:

1. A magnetic tape wind-up method for winding up a magnetic tape around a hub, which is incorporated in a cassette case, while said magnetic tape is being moved and is guided by contact member means provided in said cassette case for guiding said magnetic tape, wherein the improvement comprises:
winding up said magnetic tape while a gas is being blown against at least one of said contact member means and a portion of said magnetic tape, which portion is present in the vicinity of said contact member means, in such a way that said gas flows between said contact member means and said magnetic tape and minimizes contact between said contact member means and said magnetic tape being guided thereby, wherein aid contact member means includes a cylindrically shaped guide pole;
said gas being blown in a direction normal to a side face of said cassette case parallel to a width of said tape through a nozzle inserted into an opening in said side face of said cassette case, wherein said magnetic tape is guided by said contact member means only at one area of said contact member means, said one area being a portion of an outer circumference of said cylindrically shaped guide pole, and wherein said contact member means changes the direction of movement of said tape.

2. A magnetic tape wind-up method as claimed in claim 1, wherein a flow rate of said gas falls within a range between 10 Nl/min. to 50 Nl/min.

3. A magnetic tape wind-up method as claimed in claim 2, wherein said gas is air.

4. A magnetic tape wind-up method as claimed in claim 2, wherein said gas is nitrogen.

5. The method of claim 1, wherein said contact member means further comprises a deformable tape pad such that said gas being blown deforms the tape pad away from the tape.

6. The method of claim 1, wherein said contact member means further comprises a second cylindrically shaped guide pole positioned upstream of the first cylindrically shaped guide pole with respect to a traveling direction of said tape, said tape having first and second sides, said air being blown against said first side of said tape on an upstream side of the first guide pole with respect to the traveling direction of said tape, and said air being blown against said second side of said tape on an upstream side of said second guide pole with respect to the traveling direction of said tape.

7. A magnetic tape wind-up method for winding up a magnetic tape around a hub, which is incorporated in a cassette case, while the magnetic tape is being moved and is guided by contact member means provided in the cassette case for guiding said magnetic tape, wherein the improvement comprises:
winding up said magnetic tape while a gas is being blown from said contact member means side against a portion of said magnetic tape to minimize contact between said magnetic tape and said contact member means, said portion being present in the vicinity of said contact member means on an upstream side of said contact member means relative to a direction in which said magnetic tape guided by said contact member means is moved, wherein said contact member means includes a cylindrically shaped guide pole,
said contact member means changing the direction of movement of said magnetic tape, wherein said magnetic tape is guided by said contact member means only at one area of said contact member means, said one area being a portion of an outer circumference of said cylindrical shaped guide pole.

8. A magnetic tape wind-up method as claimed in claim 7, wherein a flow rate of said gas is adjusted to 40 Nl/min.

9. The method of claim 7, wherein said contact member means further comprises a deformable tape pad such that said gas being blown deforms the tape pad away from the tape.

10. A magnetic tape wind-up method for winding up a magnetic tape around a hub, which is incorporated in a cassette case, while the magnetic tape is being moved and is guided by contact member means provided in the cassette case for guiding said magnetic tape, wherein the improvement comprises:
winding up said magnetic tape while a gas is being blown from the magnetic tape side against said contact member means in cases where the width of said contact member means, which width is taken in the width direction of said magnetic tape, is larger than the width of said magnetic tape and said contact member means extends over a predetermined length in the direction along which said magnetic tape is moved, said gas minimizing contact between said tape and said contact member means, wherein said contact member means includes a cylindrically shaped guide pole,
said contact member means changing the direction of movement of said magnetic tape, wherein said magnetic tape is guided by said contact member means only at one area of said contact member means, said one area being a portion of an outer circumference of said cylindrically shaped guide pole.

11. The method of claim 10, wherein said contact member means further comprises a deformable tape pad such that said gas being blown deforms the tape pad away from the tape.

12. A magnetic tape wind-up method for winding up a magnetic tape around a hub, which is incorporated in a cassette case, while the magnetic tape is being moved and is guided by contact member means provided in the cassette case for guiding said magnetic tape, wherein the improvement comprises:

winding up said magnetic tape while a gas is being blown against at least one of said contact member means and a portion of said magnetic tape in such a way that said gas flows between said contact member means and said magnetic tape to minimize contact between said contact member means and said tape being guided thereby, said gas being blown directly against one area at which said magnetic tape meets said contact member means, wherein said contact member means includes a cylindrically shaped guide pole, and
wherein said magnetic tape is guided by said contact member means only at said one area of said contact member means, said one area being a portion of an outer circumference of said cylindrically shaped guide pole, wherein said contact member means changes the direction of movement of said tape.

13. The method of claim 12, wherein said contact member means further comprises a deformable tape pad such that said gas being blown deforms the tape pad away from the tape.

14. A magnetic tape wind-up method for winding up a magnetic tape around a hub, which is incorporated in a cassette case, while said magnetic tape is being moved and is guided by contact member means provided in said cassette case for guiding said magnetic tape, wherein the improvement comprises:

winding up said magnetic tape while a gas is being blown against at least one of said contact member means and a portion of said magnetic tape to minimize contact between said contact member means and said tape being guided thereby, which portion is present at a predetermined distance from said contact member means, in such a way that said gas flows between said contact member means and said magnetic tape, wherein said contact member means includes a cylindrically shaped guide pole, and
wherein said magnetic tape is guided by said contact member means only at said one area of said contact member means, said one area being a portion of an outer circumference of said cylindrically shaped guide pole, said contact member means changing the direction of movement of the tape.

15. The method of claim 14, wherein said contact member means further comprises a deformable tape pad such that said gas being blown, deforms the tape pad away from the tape.

* * * * *